(12) United States Patent
Stephens (10) Patent No.: US 8,996,681 B2
(45) Date of Patent: Mar. 31, 2015

(54) PASSIVELY ATTRIBUTING ANONYMOUS NETWORK EVENTS TO THEIR ASSOCIATED USERS

(75) Inventor: Gregory D. Stephens, Springfield, VA (US)

(73) Assignee: The Mitre Corporation, McLean, VA (US)

( * ) Notice: Subject to any disclaimer, the term of this patent is extended or adjusted under 35 U.S.C. 154(b) by 2065 days.

(21) Appl. No.: 11/790,037

(22) Filed: Apr. 23, 2007

(65) Prior Publication Data

US 2008/0263197 A1    Oct. 23, 2008

(51) Int. Cl.
- *G06F 15/173* (2006.01)
- *G06F 15/16* (2006.01)
- *H04L 29/06* (2006.01)
- *H04L 12/24* (2006.01)

(52) U.S. Cl.
CPC .......... *H04L 63/126* (2013.01); *H04L 41/0622* (2013.01); *H04L 63/1416* (2013.01)
USPC ......................................... 709/224; 709/228

(58) Field of Classification Search
USPC ........................................................ 709/224
See application file for complete search history.

(56) References Cited

U.S. PATENT DOCUMENTS

| | | | | |
|---|---|---|---|---|
| 5,627,764 A * | 5/1997 | Schutzman et al. | .......... | 709/207 |
| 5,983,270 A * | 11/1999 | Abraham et al. | ............. | 709/224 |
| 6,492,944 B1 * | 12/2002 | Stilp | ............... | 342/387 |
| 6,646,604 B2 * | 11/2003 | Anderson | ..................... | 342/465 |
| 6,813,645 B1 * | 11/2004 | Meyer | ............................ | 709/245 |
| 6,904,387 B2 * | 6/2005 | Melzer | .......................... | 702/185 |
| 6,928,471 B2 * | 8/2005 | Pabari et al. | ................... | 709/223 |
| 7,031,310 B2 * | 4/2006 | Ando et al. | .................... | 370/392 |
| 7,143,152 B1 * | 11/2006 | Elman et al. | ................... | 709/223 |
| 7,143,439 B2 * | 11/2006 | Cooper et al. | ................... | 726/11 |
| 7,539,655 B2 * | 5/2009 | Pabari et al. | ..................... | 706/28 |
| 2003/0051026 A1 * | 3/2003 | Carter et al. | .................. | 709/224 |
| 2005/0044406 A1 * | 2/2005 | Stute | ............................. | 713/201 |
| 2005/0044422 A1 * | 2/2005 | Cantrell et al. | .............. | 713/201 |
| 2005/0071465 A1 * | 3/2005 | Zeng et al. | ..................... | 709/224 |
| 2005/0188423 A1 * | 8/2005 | Motsinger et al. | .............. | 726/22 |
| 2006/0020814 A1 * | 1/2006 | Lieblich et al. | ............... | 713/182 |
| 2006/0036720 A1 * | 2/2006 | Faulk | ........................... | 709/223 |
| 2006/0140182 A1 * | 6/2006 | Sullivan et al. | .............. | 370/389 |
| 2006/0286993 A1 * | 12/2006 | Xie et al. | ....................... | 455/518 |
| 2007/0050719 A1 * | 3/2007 | Lui et al. | ........................ | 715/762 |
| 2007/0067780 A1 * | 3/2007 | Kumar et al. | ................. | 719/318 |
| 2008/0126547 A1 * | 5/2008 | Waldspurger | ................. | 709/226 |
| 2009/0119062 A1 * | 5/2009 | Owens et al. | ................. | 702/176 |

* cited by examiner

*Primary Examiner* — Brian P Whipple
*Assistant Examiner* — James Edwards
(74) *Attorney, Agent, or Firm* — Sterne, Kessler, Goldstein & Fox P.L.L.C.

(57) ABSTRACT

Systems, methods, and computer program products for passively attributing anonymous network events to their associated users are provided herein. Embodiments include filtering network events over a pre-determined time interval to generate a filtered event list. In an embodiment, event attribution includes attributing an anonymous network event to a user associated with a nearest-neighbor event relative to the anonymous network event. In another embodiment, event attribution includes attributing an anonymous network event to a user associated with an event in the filtered event list, wherein that user maximizes an event attribution function. In a further embodiment, event attribution includes determining a first potential attribution user for an anonymous network event based on a nearest-neighbor attribution approach; determining a second potential attribution user for the anonymous network event based on an event attribution function approach; and comparing the first and second potential attribution users to determine the attribution of the anonymous event.

24 Claims, 7 Drawing Sheets

100

101

| Event # | Event Type | User | Attribution | IP Address | Time |
|---|---|---|---|---|---|
| 1 | File Read | User1 | Direct | 128.255.12.145 | 3:05:43 pm |
| 2 | File Write | User1 | Indirect | 128.255.12.145 | 3:08:25 pm |
| 3 | Send Email | User3 | Indirect | 128.255.12.143 | 3:16:47 pm |
| 4 | File Move | User3 | Indirect | 128.255.12.143 | 3:17:33 pm |
| 5 | Search Query | - | Not Attributed | 128.255.121.145 | 3:19:53 pm |
| 6 | Send Email | User2 | Indirect | 128.255.121.143 | 3:21:11 pm |
| 7 | File Print | User3 | Indirect | 128.255.121.143 | 3:22:38 pm |
| 8 | File Read | User2 | Indirect | 128.255.121.145 | 3:22:49 pm |
| 9 | File Read | User2 | Direct | 128.255.121.145 | 3:22:58 pm |

102, 103, 104, 105, 106, 107, 108, 109, 110

111

| Event # | Event Type | User | Attribution | IP Address | Time |
|---|---|---|---|---|---|
| 1 | File Read | User1 | Direct | 128.255.12.145 | 3:05:43 pm |
| 5 | Search Query | - | Not Attributed | 128.255.121.145 | 3:19:53 pm |
| 9 | File Read | User2 | Direct | 128.255.121.145 | 3:22:58 pm |

| Event # | Event Type | User | Attribution | IP Address | Time |
|---------|------------|-------|----------------|-----------------|------------|
| 1 | File Read | User1 | Direct | 128.255.12.145 | 3:05:43 pm |
| 2 | File Write | User1 | Indirect | 128.255.12.145 | 3:08:25 pm |
| 3 | Send Email | User3 | Indirect | 128.255.12.143 | 3:16:47 pm |
| 4 | File Move | User3 | Indirect | 128.255.12.143 | 3:17:33 pm |
| 5 | Search Query | - | Not Attributed | 128.255.121.145 | 3:19:53 pm |
| 6 | Send Email | User2 | Indirect | 128.255.121.145 | 3:21:11 pm |
| 7 | File Print | User3 | Indirect | 128.255.121.143 | 3:22:38 pm |
| 8 | File Read | User2 | Indirect | 128.255.121.145 | 3:22:49 pm |
| 9 | File Read | User2 | Direct | 128.255.121.145 | 3:22:58 pm |

201

| Event # | Event Type | User | Attribution | IP Address | Time |
|---------|------------|-------|----------------|-----------------|------------|
| 1 | File Read | User1 | Direct | 128.255.12.145 | 3:05:43 pm |
| 2 | File Write | User1 | Indirect | 128.255.12.145 | 3:08:25 pm |
| 3 | Search Query | - | Not Attributed | 128.255.121.145 | 3:19:53 pm |
| 4 | Send Email | User2 | Indirect | 128.255.121.145 | 3:21:11 pm |
| 5 | File Read | User2 | Indirect | 128.255.121.145 | 3:22:49 pm |
| 6 | File Read | User2 | Direct | 128.255.121.145 | 3:22:58 pm |

Table 101:

| Event # | Event Type | User | Attribution | IP Address | Time |
|---|---|---|---|---|---|
| 1 | File Read | User1 | Direct | 128.255.12.145 | 3:05:43 pm |
| 2 | File Write | User1 | Indirect | 128.255.12.145 | 3:08:25 pm |
| 3 | Send Email | User3 | Indirect | 128.255.12.143 | 3:16:47 pm |
| 4 | File Move | User3 | Indirect | 128.255.12.143 | 3:17:33 pm |
| 5 | Search Query | - | Not Attributed | 128.255.121.145 | 3:19:53 pm |
| 6 | Send Email | User2 | Indirect | 128.255.121.145 | 3:21:11 pm |
| 7 | File Print | User3 | Indirect | 128.255.121.143 | 3:22:38 pm |
| 8 | File Read | User2 | Indirect | 128.255.121.145 | 3:22:49 pm |
| 9 | File Read | User2 | Direct | 128.255.121.145 | 3:22:58 pm |

Table 401:

| Event # | Event Type | User | Attribution | IP Address | Time |
|---|---|---|---|---|---|
| 1 | File Read | User1 | Direct | 128.255.12.145 | 3:05:43 pm |
| 2 | File Write | User1 | Indirect | 128.255.12.145 | 3:08:25 pm |
| 5 | Search Query | - | Not Attributed | 128.255.121.145 | 3:19:53 pm |
| 6 | Send Email | User2 | Indirect | 128.255.121.145 | 3:21:11 pm |
| 8 | File Read | User2 | Indirect | 128.255.121.145 | 3:22:49 pm |
| 9 | File Read | User2 | Direct | 128.255.121.145 | 3:22:58 pm |

# PASSIVELY ATTRIBUTING ANONYMOUS NETWORK EVENTS TO THEIR ASSOCIATED USERS

BACKGROUND OF THE INVENTION

1. Field of the Invention

The present invention relates generally to computer networks, and more particularly to insider threat detection in computer networks.

2. Background Art

In many situations, network and security analysts need to map observed network events to the users that generated them. However, many events produced by devices such as network-based intrusion detection systems (NIDSs) and firewalls only identify the source of the event as an Internet Protocol (IP) address of the originating host. Unfortunately, IP addresses cannot be statically mapped to users within most internal corporate local area networks (LANs). The commonly used Dynamic Host Configuration Protocol (DHCP) dynamically leases IP addresses to hosts on a first-come, first-served basis and for limited durations. In addition, many organizations take advantage of Microsoft Windows Roaming Profiles to permit their mobile users to effectively operate from any workstation. Mapping IP addresses to users is particularly important for insider threat detection, which requires knowledge of the user behind the observed behavior.

Passive fingerprinting allows the identification of the host operating system by observing the TCP/IP protocol and welcome banners associated with well known services (e.g., telnet). More recently, passive fingerprinting has allowed detection of applications running on a host by detecting and analyzing network protocols in use. However, passive fingerprinting does not allow the passive attribution of anonymous network events to their associated users.

What are needed therefore are methods for passively attributing anonymous network events to their associated users.

BRIEF SUMMARY OF THE INVENTION

Systems, methods, and computer program products for passively attributing anonymous network events to their associated users are provided herein.

Embodiments of the present invention include filtering network events occurring over a pre-determined time interval to generate a filtered event list. Filtering of the events may be done according to one or more parameters. Based on the filtered event list and the event attribution approach, anonymous network events are attributed to users associated with events in the filtered event list.

In an embodiment, event attribution includes attributing an anonymous network event to a user associated with a nearest-neighbor event relative to the anonymous network event. The nearest-neighbor event may be determined based on time proximity or distance relative to the anonymous event.

In another embodiment, event attribution includes attributing an anonymous network event to a user associated with an event in the filtered event list, wherein that user maximizes an event attribution function.

In a further embodiment, event attribution includes determining a first potential attribution user for an anonymous network event based on a nearest-neighbor attribution approach; determining a second potential attribution user for the anonymous network event based on an event attribution function approach; and comparing the first and second potential attribution users to determine the attribution of the anonymous event.

Embodiments of the present invention can be performed off-line or in real-time.

Embodiments of the present invention can be used, for example, by organizations to complement network intrusion detection systems (NIDSs), network forensic analysis tools (NFATs), and security information management systems (SIMSs). As noted above, NIDSs can only monitor network activity by IP address and would thus benefit from methods according to embodiments of the present invention to increase their monitoring capabilities. Similarly, network forensic analysis tools that analyze system network packets and security information management systems that analyze events from security devices would benefit from methods according to the present invention.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Figure 1:
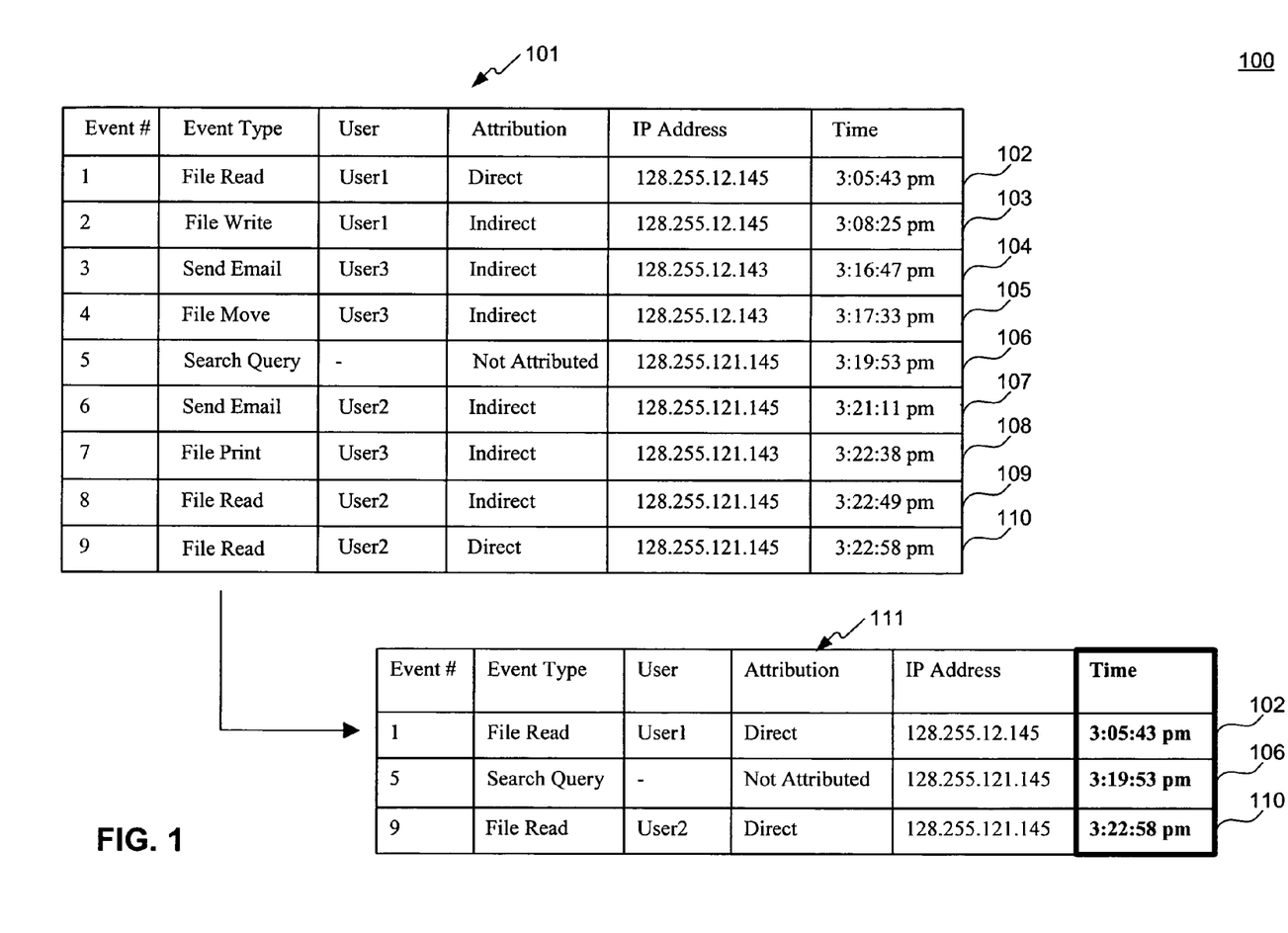
FIG. 1 is an example that illustrates a method for passively attributing anonymous network events to users according to an embodiment of the present invention.

FIG. 1 is an example 100 that illustrates a method for passively attributing anonymous network events to users, according to an embodiment of the present invention.

Table 101 includes a list of network events that occurred over a pre-determined time interval over a network. Associated with each event in table 101 are an event type, a user, an attribution type, an Internet Protocol (IP) address, and a timestamp.

The event type represents an action performed by the event. For example, event 107 is associated with an action to send an email over the network.

The user represents an identity of a network user who is thought to have performed the event. Typically, an event is associated with a user with a given degree of certainty. In table 101, this is described by the attribution type of the event, which represents a level of confidence between the event and its associated user. In example 100, events may be directly attributed, indirectly attributed, or un-attributed. Directly attributed events are attributed with high confidence to their associated users. For example, an event can be directly attributed to a user if it occurs within a network protocol session that is preceded by a successful user authentication. Indirectly attributed events are attributed with less confidence to their associated users but with enough confidence to be attributed. For example, an event can be indirectly attributed to a user by using certain indicators that suggest some confidence that the user performed the event. On the other hand, un-attributed events lack user attribution. Alternatively, events may be either attributed or unattributed. In such embodiment, each event may be associated with a user with a confidence level between 0 and 1. The confidence level is compared to a pre-defined threshold to determine whether the event is attributed or unattributed.

Referring back to table 101, the IP address associated with an event represents the IP address where the event originated or is performed. The timestamp represents the time of occurrence of the event.

According to an embodiment of the present invention, events that are not directly attributed undergo a process by which they become directly attributed to a user. In the case of indirectly attributed events, the attribution process usually labels the events with the identity of the same users to which the events were indirectly attributed. Event attribution is described below with respect to an un-attributed event, though the same method is applicable to indirectly attributed events.

The method illustrated in example 100 seeks to attribute event 106, which is an un-attributed "search query", to a network user. Accordingly, the pre-determined time interval spanned by the events in table 101 is set according to the timestamp associated with event 106. For example, the time interval is set so that it is centered around the timestamp associated with event 106. It is noted that, for ease of illustration, only nine events 102-110 are shown in table 101. In actual implementation, table 101 may include a larger number of events, which, for example, may span several hours of network time.

The method in example 100 works by filtering the list of events contained in table 101 to generate a filtered event list 111. In the embodiment of example 100, table 101 is filtered according to IP address and attribution type so that only events with direct attribution and originating at the same IP address as event 106 are included in filtered event list 111 (in addition to event 106). Note, for example, that events 104, 105, and 108 are filtered out because they occur at a different IP address than where event 106 occurred. Similarly, events 103, 107, and 109 are filtered out because they are indirectly attributed to their associated users.

According to example 100, filtered event list 111 includes only two directly attributed events 102 and 110 that also occurred at the same IP address as event 106. Event 102 is directly attributed to User1. Event 110 is directly attributed to User2. As such, event 106 may be attributed to either User1 or User2. In an embodiment, the method attributes event 106 to the user associated with the nearest-neighbor event relative to event 106.

In example 100, the nearest-neighbor event relative to event 106 is determined by selecting the event in filtered event list 111 that is closest in time to event 106. Accordingly, event 110 is the nearest-neighbor event relative to event 106, and event 106 is attributed to User2. This is because event 110 is approximately 3 minutes apart from event 106, while event 102 is approximately 14 minutes apart from event 106. Alternatively, the nearest-neighbor event relative to event 106 is determined by selecting the event in filtered event list 111 that is closest in distance, measured in event count, to event 106. In example 100, however, event 106 is equidistant from events 102 and 110 (three events apart in both cases) and time proximity would need to be used to resolve the nearest-neighbor determination.

Figure 2:
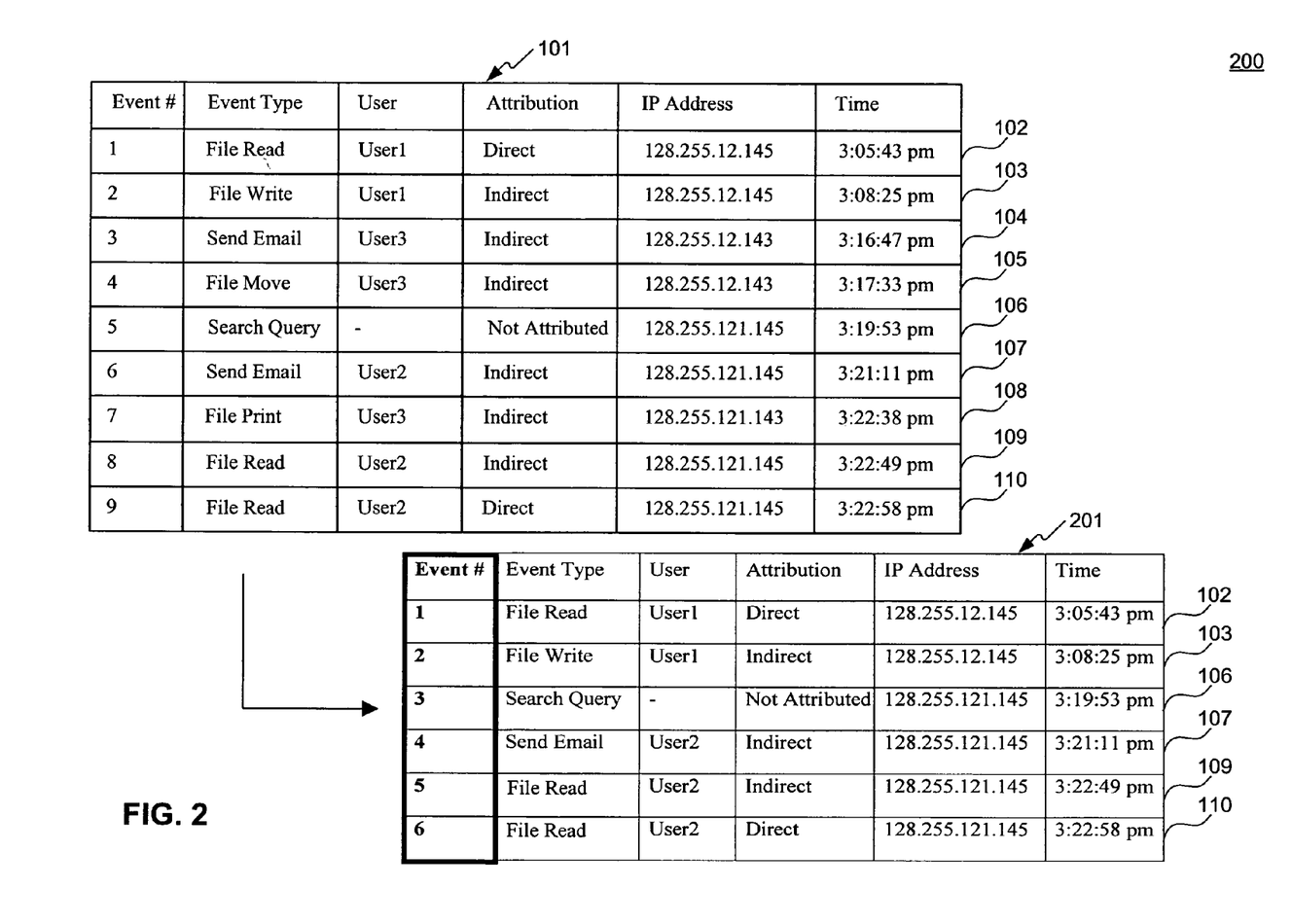
FIG. 2 is an example that illustrates another embodiment of the method of FIG. 1.

FIG. 2 is an example 200 that illustrates another embodiment of the method of FIG. 1. Similar to example 100, the method in example 200 works by filtering the list of events in table 101 to generate a filtered event list 201. Note that table 101 is only filtered by IP address to retain only those events occurring at the same IP address as event 106. As such, filtered event list 201 contains both directly and indirectly attributed events (in addition to event 106, which is sought to be attributed).

The method of example 200 also attributes event 106 to the user associated with the nearest-neighbor event relative to event 106. However, in example 200, the nearest-neighbor event is determined by selecting the nearest event in distance to event 106 that is directly attributed, in a chronological ordering of the events in filtered event list 201. In other words, the method of example 200 considers the relative ordering of events in filtered event list 201 to determine the nearest-neighbor event relative to event 106. Alternatively, the nearest-neighbor event relative to event 106 is determined by selecting the event in filtered event list 201 that is closest in time to event 106.

As illustrated in FIG. 2, each event in filtered event list 201 is assigned a relative position denoted by an event number. The nearest-neighbor event is then determined by comparing the positions of directly attributed events relative to the position of event 106. In example 200, only events 102 and 110 are directly attributed. Event 102 is assigned event number 1 and is separated from event 106 (event number 3) by a single event. On the other hand, event 110 is assigned event number 6 and is separated from event 106 by two events. Accordingly, event 102 is closer in distance to event 106 than event 110 and is thus the nearest-neighbor event relative to event 106. As such, in example 200, event 106 is attributed to the same user, User1, as event 102.

In cases where the event being attributed is at an equal distance from the two nearest directly attributed events, other nearest-neighbor determination methods including time proximity can be used.

Note that examples 100 and 200 result in different attribution of event 106 based on the approach used for nearest-neighbor event determination. The invention is not limited to the example methods of FIGS. 1 and 2. As would be understood, other variations of nearest-neighbor determination can be used.

Figure 3:
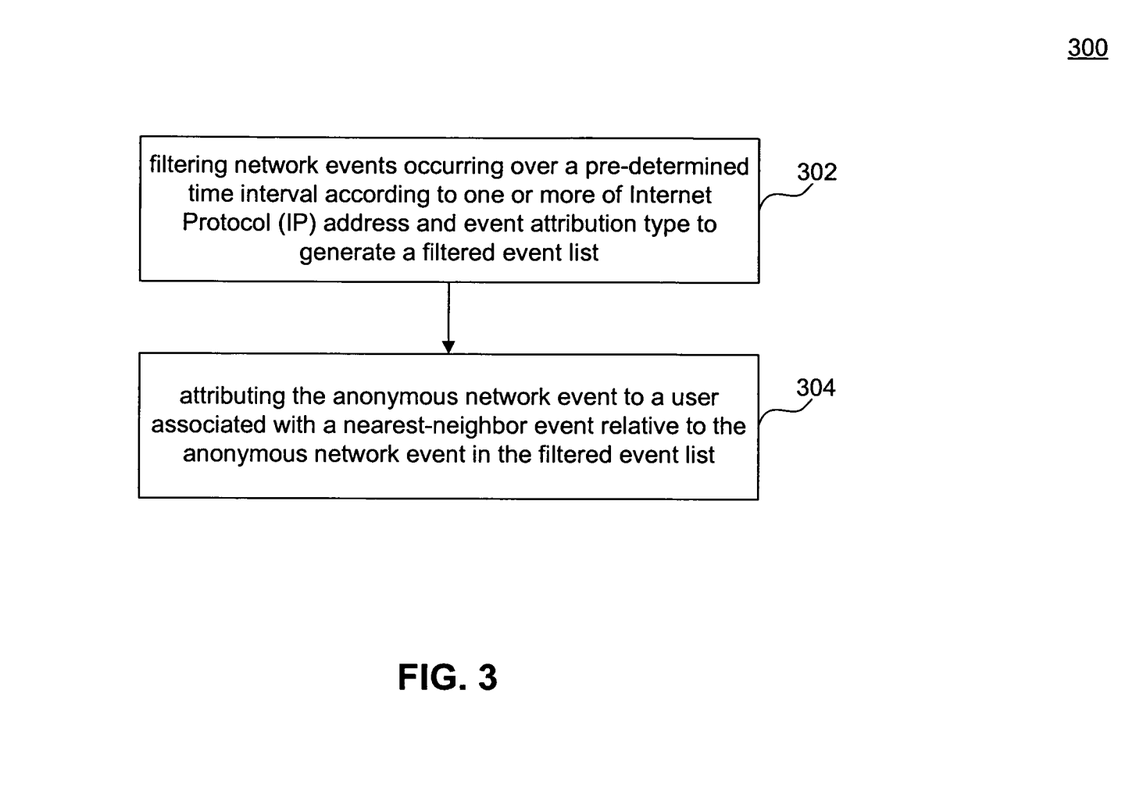
FIG. 3 is a process flowchart of the methods of FIGS. 1 and 2.

FIG. 3 is a process flowchart 300 corresponding to the methods of FIGS. 1 and 2. Process flowchart 300 begins in step 302, which includes filtering network events occurring over a pre-determined time interval according to IP address and/or event attribution type to generate a filtered event list. In an embodiment, other event characteristics can be used to filter network events in step 302.

In an embodiment, the filtering includes determining network events occurring within the pre-determined time interval that originate from the same IP address as the anonymous network event and/or that have direct and/or indirect attribution to associated users. Network events can be directly attributed, indirectly attributed, or un-attributed. As described above, a directly attributed event is one that is attributed to a given user with high confidence. This may be due to a successful authentication event, for example, such as a login. An un-attributed event is an anonymous event. Indirectly attributed events are those with some type of user context. For example, an "email send" event with the sender's email address in the email can be an indirectly attributed event.

The pre-determined time interval is selected according to a timestamp associated with the anonymous network event. In an embodiment, the time interval is centered around the timestamp associated with the anonymous event. The width of the time interval may be a function of the rate of occurrence of network events.

Step 304 includes attributing the anonymous network event to a user associated with a nearest-neighbor event relative to the anonymous network event in the filtered event list.

In an embodiment, step 304 includes attributing the anonymous network event to a user associated with an event in the filtered event list having direct attribution and that is nearest in distance to the anonymous network event in a chronological ordering of the filtered event list. Attribution according to this embodiment is illustrated, for example, in FIG. 2.

In another embodiment, step 304 includes attributing the anonymous network event to a user associated with an event in the filtered event list having direct attribution and that is nearest in time to the anonymous network event. Attribution according to this embodiment is illustrated, for example, in FIG. 1.

In practice, events are attributed to users through user identifiers that are associated with the users. For example, the user "John Smith" may have an account userid of "jsmith" that is used to attribute events performed by the userid to the actual user. At the same time, emails sent from the email account "john.smith@some.company" are also events by the same user "John Smith". It is important that these events are attributed to the same user identity and not be identified as performed by different users. In an embodiment, the different user identifiers (e.g., jsmith, john.smith@some.company, etc.) are normalized to a common form (e.g., jsmith) through the use of a lookup table that maps all the different identifiers associated with a user to this common form.

Figure 4:
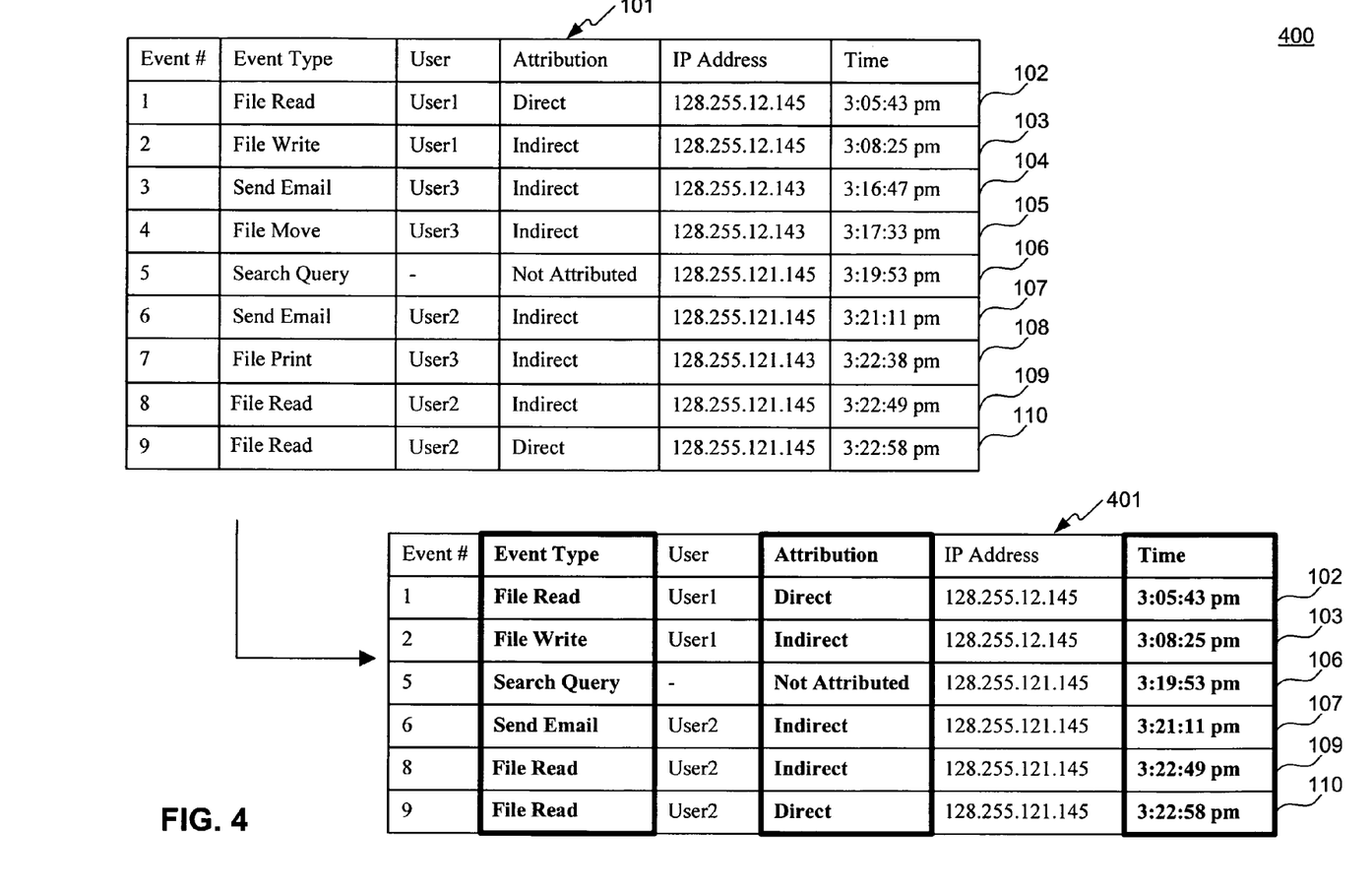
FIG. 4 is an example that illustrates another method for passively attributing anonymous network events to users according to an embodiment of the present invention.

FIG. 4 is an example 400 that illustrates another method for passively attributing anonymous network events to users according to an embodiment of the present invention.

The method in example 400 works by filtering the list of events in table 101 to generate a filtered event list 401. Note that table 401 is filtered, as in example 200, by IP address to retain only those events occurring at the same IP address as event 106. As such, filtered event list 401 contains both directly and indirectly attributed events (in addition to event 106, which is sought to be attributed).

The method then attributes event 106 to a user associated with an event in filtered event list 401, where that user maximizes an event attribution function. In example 400, there are only two distinct users, User1 and User2, that are associated with events in filtered event list 401. As such, the method of example 400 determines which of User1 or User2 results in a higher value of an event attribution function and attributes event 106 to that user. In an embodiment, if both event attribution function values are lower than a given threshold, the event remains un-attributed.

In an embodiment, the event attribution function value for a given user is related to the events associated with that user in filtered event list 401. For example, the event attribution function value may be a function of certain characteristics of those events including event type, event attribution type, and/or event proximity to the event being attributed (event 106 in example 400).

In example 400, events 102 and 103 are attributed to User1. On the other hand, events 107, 109, and 110 are attributed to User2. Each of users User1 and User2 has one directly attributed event associated with it, namely events 102 and 110, respectively. In an embodiment, the event attribution function value is calculated for a given user as a sum of the form:

$$\Sigma_{e_j \in S^{(u)}} K(e_i, e_j) \qquad (1)$$

where K is a kernel function, $e_i$ represents the event being attributed, and $S^{(u)}$ is the sequence of events associated with that given user in the filtered event list.

The kernel function $K(e_i, e_j)$ calculates a value for a given event $e_j$ with respect to event $e_i$. In an embodiment, the kernel function factors in the event type, the event attribution type, and the time proximity of event $e_j$ relative to event $e_i$. For example, the kernel function may be of the form:

$$K(e_i, e_j) = \omega_j e^{-\gamma(t_i - t_j)^2} \qquad (2)$$

wherein $\omega_j$ represents a weight associated with event $e_j$ according to event type and/or attribution type, $t_j$ represents the time of occurrence of event $e_j$, $t_i$ represents the time of occurrence of the anonymous event, and $\gamma$ represents a width of the kernel function.

In an example implementation, an event $e_j$ is assigned a weight $\omega_j$ of 1.0 if it is directly attributed and of 0.9 if it is indirectly attributed. The weight correlates with the confidence level associated with the attribution of the event. Accordingly, in example 400, for $\gamma$ equal to $5 \times 10^{-5}$, the event attribution function value for User1 and User2 with respect to event 106, calculated according to equation (1), would be approximately equal to $4.7 \times 10^{-11}$ and 1.036, respectively. Event 106 is therefore attributed to User2. In another implementation, the weight of an indirectly attributed event also varies according to the event type.

Figure 5:
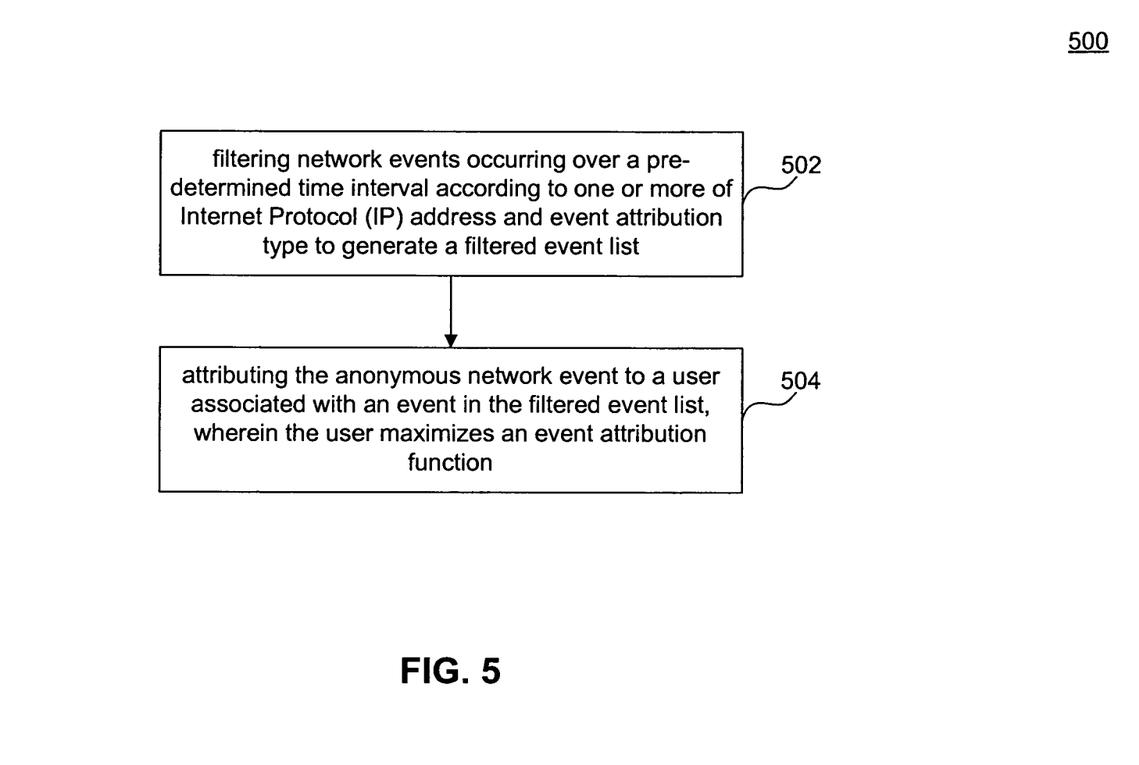
FIG. 5 is a process flowchart of the method of FIG. 4.

FIG. 5 is a process flowchart 500 of the method of FIG. 4. Process flowchart 500 begins in step 502, which includes filtering network events occurring over a pre-determined time interval according to one or more of IP address and event attribution type to generate a filtered event list.

In an embodiment, the filtering includes determining network events occurring within the pre-determined time interval that originate from the same IP address as the anonymous network event and/or that have direct and/or indirect attribution to associated users. As described above, network events can be directly attributed, indirectly attributed, or un-attributed.

The pre-determined time interval is selected according to a timestamp associated with the anonymous network event. In an embodiment, the time interval is centered around the timestamp associated with the anonymous event. The width of the time interval may be a function of the rate of network events.

Step 504 includes attributing the anonymous network event to a user associated with an event in the filtered event list, wherein the user maximizes an event attribution function.

In an embodiment, step 504 includes calculating, for each user associated with an event in the filtered event list, an event attribution function value; and selecting a user having the largest event attribution function value to associate with the anonymous network event. In an embodiment, the event attribution function value, for each user, is related to events associated with the user within the pre-determined time interval. Further, the event attribution function value may be related to one or more of the event type, event attribution type, and event time proximity relative to the anonymous network event of the events associated with the user within the pre-determined time interval.

In an embodiment, the event attribution function value is calculated according to:

$$\Sigma_{e_j \in S^{(u)}} K(e_i, e_j) \quad (3)$$

wherein $e_i$ represents the anonymous network event, $S^{(u)}$ represents a set of events associated with a given user in the filtered event list, and K represents a kernel function.

In an embodiment, the kernel function K is according to:

$$K(e_i, e_j) = \omega_j e^{-\gamma(t_i - t_j)^2} \quad (4)$$

wherein $\omega_j$ represents a weight associated with an event according to event type and/or attribution type, $t_j$ represents the time of occurrence of the event, $t_i$ represents the time of occurrence of the anonymous event, and $\gamma$ represents a width of the kernel function.

Directly attributed events are assigned greater weight than indirectly attributed or un-attributed events. In an embodiment, directly attributed events are assigned a weight of 1.0 and un-attributed events are assigned a weight of 0.0. Indirectly attributed events are assigned weights between 0 and 1 depending on event type. For example, indirectly attributed "print" events may be assigned a weight of 0.999, indirectly attributed "email send" events may be assigned a weight of 0.99, and "FTP" events may be assigned a weight of 0.9.

Figure 6:
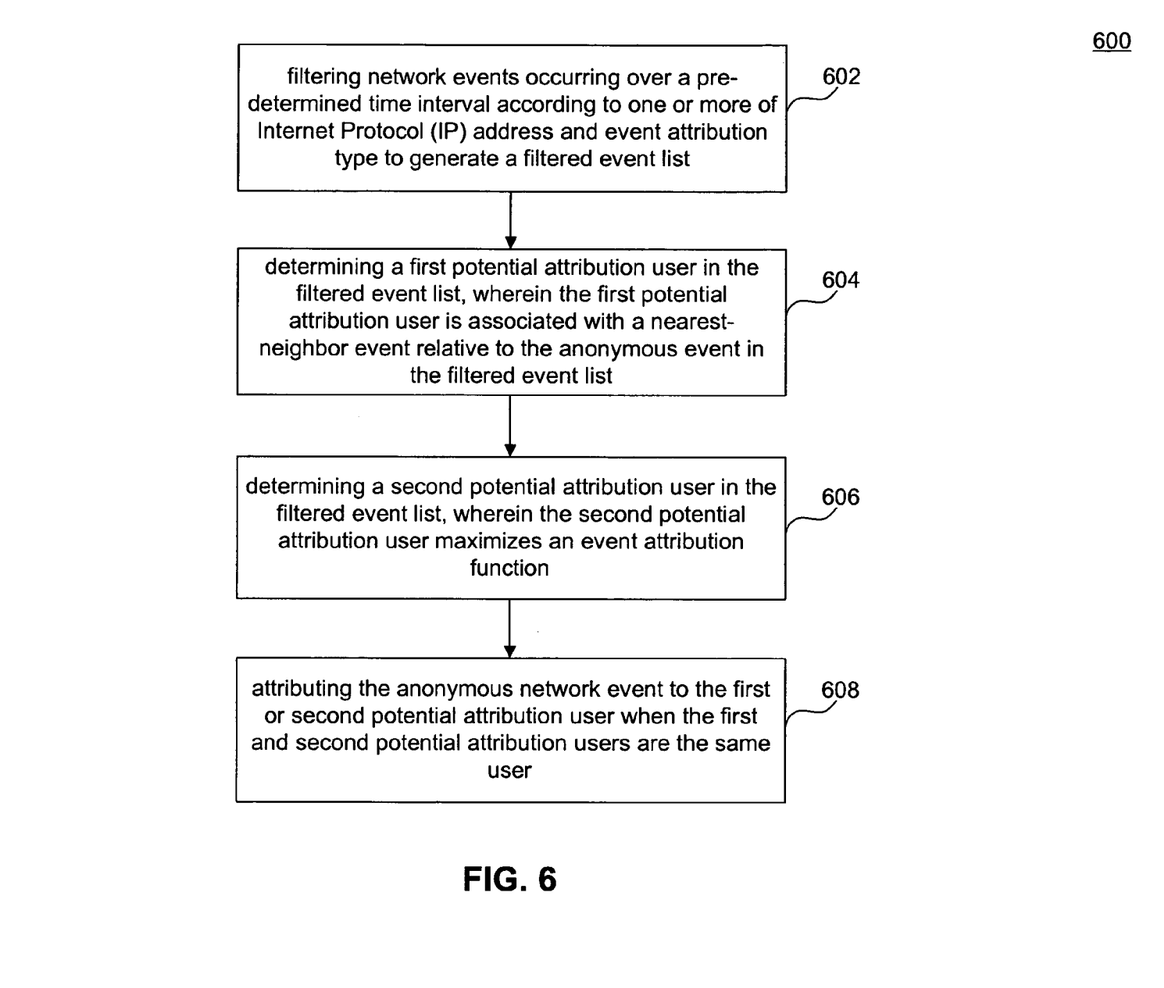
FIG. 6 is a process flowchart of another method for passively attributing anonymous network events to users according to the present invention.

FIG. 6 is a process flowchart 600 of another method for passively attributing anonymous network events to users according to the present invention. Process flowchart 600 begins in step 602, which includes filtering network events occurring over a predetermined time interval according to IP address and/or event attribution type to generate a filtered event list.

Step 604 includes determining a first potential attribution user in the filtered event list, wherein the first potential attribution user is associated with a nearest-neighbor event relative to the anonymous network event in the filtered event list. In an embodiment, step 604 implements a method according to process flowchart 300 of FIG. 3.

Step 606 includes determining a second potential attribution user in the filtered event list, wherein the second potential attribution user maximizes an event attribution function. In an embodiment, step 606 implements a method according to process flowchart 500 of FIG. 5.

Step 608 includes attributing the anonymous network event to the first or second potential attribution user when the first and second potential attribution users are the same user. Alternatively, step 608 includes maintaining the anonymous network event un-attributed if the first and second potential attribution users are different or if the weight calculated for the un-attributed event using the event attribution function is less than a specified threshold.

Embodiments of the present invention such as methods according to process flowcharts 300, 500, and 600, for example, can be performed off-line or in real-time.

Embodiments of the present invention can be used by organizations to complement network-based intrusion detection systems (NIDSs), network forensic analysis tools (NFATs), and security information management systems (SIMSs). As noted above, NIDSs can only monitor network activity by IP address and would thus benefit from methods according to the present invention to increase their monitoring capabilities. Similarly, network forensic analysis tools that analyze system network packets and security information management systems that analyze events from security devices would benefit from methods according to the present invention. In both cases, knowing the identity of the user account associated with a given event helps provide analysts the information needed to effectively respond to the observed activity.

Example Computer Implementation

Figure 7:
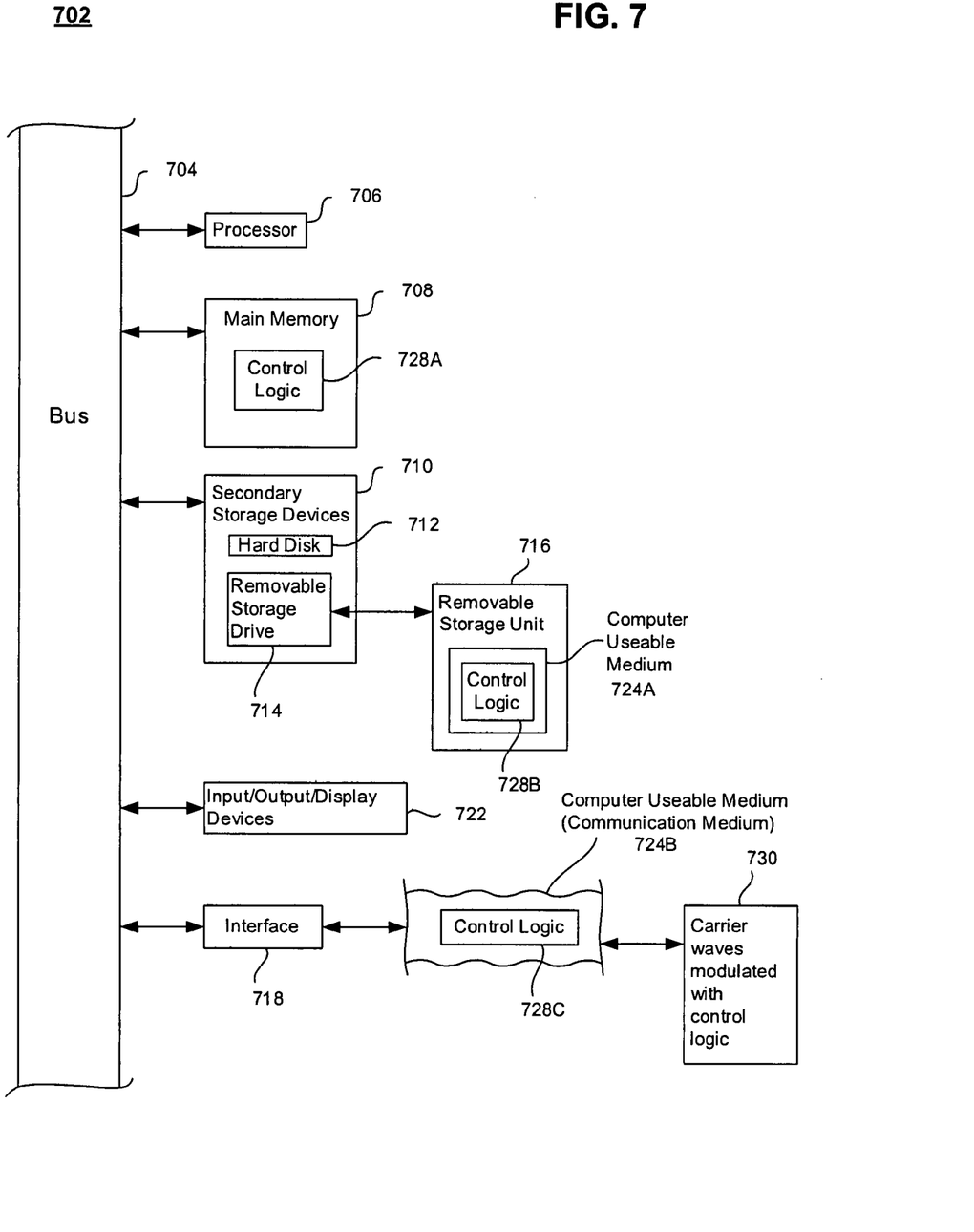
FIG. 7 illustrates an example computer useful for implementing components of the invention.

In an embodiment of the present invention, the system and components of the present invention described herein are implemented using well known computers, such as computer 702 shown in FIG. 7.

The computer 702 can be any commercially available and well known computer capable of performing the functions described herein, such as computers available from International Business Machines, Apple, Sun, HP, Dell, Compaq, Digital, Cray, etc.

The computer 702 includes one or more processors (also called central processing units, or CPUs), such as a processor 706. The processor 706 is connected to a communication bus 704.

The computer 702 also includes a main or primary memory 708, such as random access memory (RAM). The primary memory 708 has stored therein control logic 728A (computer software), and data.

The computer 702 also includes one or more secondary storage devices 710. The secondary storage devices 710 include, for example, a hard disk drive 712 and/or a removable storage device or drive 714, as well as other types of storage devices, such as memory cards and memory sticks. The removable storage drive 714 represents a floppy disk drive, a magnetic tape drive, a compact disk drive, an optical storage device, tape backup, etc.

The removable storage drive 714 interacts with a removable storage unit 716. The removable storage unit 716 includes a computer useable or readable storage medium 724 having stored therein computer software 728B (control logic) and/or data. Removable storage unit 716 represents a floppy disk, magnetic tape, compact disk, DVD, optical storage disk, or any other computer data storage device. The removable storage drive 714 reads from and/or writes to the removable storage unit 716 in a well known manner.

The computer 702 also includes input/output/display devices 722, such as monitors, keyboards, pointing devices, etc.

The computer 702 further includes a communication or network interface 718. The network interface 718 enables the computer 702 to communicate with remote devices. For example, the network interface 718 allows the computer 702 to communicate over communication networks or mediums 724B (representing a form of a computer useable or readable medium), such as LANs, WANs, the Internet, etc. The network interface 718 may interface with remote sites or networks via wired or wireless connections.

Control logic 728C may be transmitted to and from the computer 702 via the communication medium 724B. More particularly, the computer 702 may receive and transmit carrier waves (electromagnetic signals) modulated with control logic 730 via the communication medium 724B.

Any apparatus or manufacture comprising a computer useable or readable medium having control logic (software) stored therein is referred to herein as a computer program product or program storage device. This includes, but is not limited to, the computer 702, the main memory 708, the secondary storage devices 710, and the removable storage unit 716. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for passively attributing an anonymous network event to an associated user, comprising:
filtering network events occurring over a pre-determined time interval according to at least one of Internet Protocol (IP) address and event attribution type to generate a filtered event list, wherein said event attribution type indicates a confidence level associated with the user attribution of an event; and
attributing the anonymous network event to a user associated with an event in said filtered event list, wherein said user maximizes an event attribution function,
wherein said attributing step further comprises:
calculating, for each user associated with an event in said filtered event list, an event attribution function value, said event attribution function value indicating a confidence level associated with the attribution of the anonymous event to said each user; and
selecting a user having the largest event attribution function value.

2. The method of claim 1, wherein said pre-determined time interval is selected according to a timestamp associated with the anonymous network event.

3. The method of claim 1, wherein said filtering step comprises determining network events originating from the same IP address as the anonymous network event.

4. The method of claim 1, wherein said filtering step comprises determining network events having direct and/or indirect attribution to associated users.

5. The method of claim 1, wherein, for each user associated with an event in said filtered list, the event attribution function value is related to events associated with said each user within said pre-determined time interval.

6. The method of claim 5, wherein the event attribution function value is related to one or more of event type, event attribution type, and event time proximity relative to the anonymous network event of said events associated with said each user.

7. The method of claim 1, wherein the event attribution function value is calculated according to:

$$\Sigma_{e_j \in S^{(u)}} K(e_i, e_j)$$

wherein $e_i$ represents the anonymous network event, $S^{(u)}$ represents a set of events associated with a given one of said each user, and K represents a kernel function.

8. The method of claim 7, wherein the kernel function is according to:

$$K(e_i, e_j) = \omega_j e^{-\gamma(t_i - t_j)^2}$$

wherein $\omega_j$ represents a weight associated with an event according to event type and/or attribution type, $\gamma$ represents a width of the kernel function, and $t_i$ represents the time of occurrence of the anonymous event.

9. The method of claim 1, wherein the event attribution type is one of direct attribution, indirect attribution, or unattributed.

10. A method for passively attributing an anonymous network event to an associated user, comprising:
filtering network events occurring over a pre-determined time interval according to Internet Protocol (IP) address and event attribution type to generate a filtered event list, wherein said event attribution type indicates a confidence level associated with the user attribution of an event; and
attributing the anonymous network event to a user associated with a nearest-neighbor event relative to said anonymous network event in said filtered event list, wherein said nearest-neighbor event is at least one of (a) nearest in time to the anonymous network event and (b) nearest in distance to the anonymous network event in said filtered event list.

11. The method of claim 10, wherein said pre-determined time interval is selected according to a timestamp associated with the anonymous network event.

12. The method of claim 10, wherein said filtering step comprises determining network events originating from the same IP address as the anonymous network event.

13. The method of claim 10, wherein said filtering step comprises determining network events having direct and/or indirect attribution to associated users.

14. The method of claim 10, wherein said attributing step comprises attributing the anonymous network event to a user associated with an event in said filtered event list, wherein said event has direct attribution and is nearest in distance to the anonymous network event in a chronological ordering of said filtered event list.

15. The method of claim 10, wherein said attributing step comprises attributing the anonymous network event to a user associated with an event in said filtered event list, wherein said event has direct attribution and is nearest in time to the anonymous network event.

16. The method of claim 10, wherein said attributing step comprises attributing the anonymous network event to a user associated with an event in said filtered event list, wherein said event has direct attribution and is nearest in distance to the anonymous network event based on an event count separating said event from the anonymous network event.

17. The method of claim 10, wherein said attributing step comprises attributing the anonymous network event to a user associated with an event in said filtered event list, wherein said event is nearest in time to the anonymous network event.

18. The method of claim 10, wherein the event attribution type is one of direct attribution, indirect attribution, or unattributed.

19. A method for passively attributing an anonymous network event to an associated user, comprising:
filtering network events occurring over a pre-determined time interval according to at least one of Internet Protocol (IP) address and event attribution type to generate a filtered event list, wherein said event attribution type indicates a confidence level associated with the user attribution of an event;
determining a first potential attribution user for said anonymous network event in said filtered event list, wherein said first potential attribution user is associated with a nearest-neighbor event relative to said anonymous event in said filtered event list;

determining a second potential attribution user for said anonymous network event in said filtered event list, wherein said second potential attribution user maximizes an event attribution function; and attributing the anonymous network event to the first or second potential attribution user when said first and second potential attribution users correspond to the same user.

20. The method of claim 19, further comprising:
maintaining the anonymous network event unattributed if the first and second potential attribution users are different.

21. The method of claim 19, wherein the method is performed off-line or in real-time.

22. A computer program product comprising a computer useable hardware medium having computer program logic recorded, the computer logic when executed by a processor enabling passive attribution of an anonymous network event to an associated user according to a method, the method comprising:

filtering network events occurring over a pre-determined time interval according to at least one of Internet Protocol (IP) address and event attribution type to generate a filtered event list, wherein said event attribution type indicates a confidence level associated with the user attribution of an event; and attributing the anonymous network event to a user associated with an event in said filtered event list, wherein said user maximizes an event attribution function, wherein said attributing step further comprises:
calculating, for each user associated with an event in said filtered event list, an event attribution function value, said even attribution function value indicating a confidence level associated with the attribution of the anonymous event to said each user; and selecting a user having the largest event attribution function value.

23. A computer program product comprising a computer useable hardware medium having computer program logic recorded thereon, the computer logic when executed by a processor enabling passive attribution of an anonymous network event to an associated user according to a method, the method comprising:

filtering network events occurring over a pre-determined time interval according to Internet Protocol (IP) address and event attribution type to generate a filtered event list, wherein said event attribution type indicates a confidence level associated with the user attribution of an event; and attributing the anonymous network event to a user associated with a nearest-neighbor event relative to said anonymous network event in said filtered event list, wherein said nearest-neighbor event is at least one of (a) nearest in time to the anonymous network event and (b) nearest in distance to the anonymous network in said filtered event list.

24. A computer program product comprising a computer useable hardware medium having computer program logic recorded thereon, the computer logic when executed by a processor enabling passive attribution of an anonymous network event to an associated user according to a method, the method comprising:

filtering network events occurring over a pre-determined time interval according to at least one of Internet Protocol (IP) address and event attribution type to generate a filtered event list, wherein said event attribution type indicates a confidence level associated with the user attribution of an event;

determining a first potential attribution user for said anonymous network event in said filtered event list, wherein said first potential attribution user is associated with a nearest-neighbor event relative to said anonymous event in said filtered event list;

determining a second potential attribution user for said anonymous network event in said filtered event list, wherein said second potential attribution user maximizes an event attribution function; and attributing the anonymous network event to the first or second potential attribution user when said first and second potential attribution users correspond to the same user.

* * * * *